(12) United States Patent
McLeod

(10) Patent No.: US 8,751,025 B2
(45) Date of Patent: Jun. 10, 2014

(54) CONTROL SEQUENCER

(75) Inventor: Gordon Richard McLeod, West Lothian (GB)

(73) Assignee: Wolfson Microelectronics plc, Edinburgh (GB)

( * ) Notice: Subject to any disclaimer, the term of this patent is extended or adjusted under 35 U.S.C. 154(b) by 554 days.

(21) Appl. No.: 12/670,607

(22) PCT Filed: Jun. 25, 2008

(86) PCT No.: PCT/GB2008/002169
§ 371 (c)(1),
(2), (4) Date: Feb. 26, 2010

(87) PCT Pub. No.: WO2009/013451
PCT Pub. Date: Jan. 29, 2009

(65) Prior Publication Data
US 2010/0205412 A1    Aug. 12, 2010

(30) Foreign Application Priority Data

Jul. 25, 2007  (GB) .................................. 0714513.9

(51) Int. Cl.
*G06F 17/00*     (2006.01)
*G06F 3/16*      (2006.01)
(52) U.S. Cl.
CPC ...................................... *G06F 3/162* (2013.01)
USPC ........................................................ 700/94

(58) Field of Classification Search
USPC .......................... 700/94; 369/1–12; 455/3.06; 704/500–504
See application file for complete search history.

(56) References Cited

U.S. PATENT DOCUMENTS

| 5,157,728 A * | 10/1992 | Schorman et al. ............ 704/502 |
| 5,796,440 A | 8/1998 | Rupinski et al. |
| 5,981,860 A * | 11/1999 | Isozaki et al. .................. 84/603 |
| 6,301,366 B1 | 10/2001 | Malcolm, Jr. et al. |
| 2004/0213052 A1* | 10/2004 | Ware et al. .................... 365/194 |
| 2007/0104377 A1 | 5/2007 | Fukui |

FOREIGN PATENT DOCUMENTS

| EP | 1 890 220 A2 | 2/2008 |
| GB | 923609 A | 4/1963 |
| JP | 2004-266869 A | 9/2004 |
| WO | WO-2007/021209 A1 | 2/2007 |

* cited by examiner

*Primary Examiner* — Andrew C Flanders
(74) *Attorney, Agent, or Firm* — Dickstein Shapiro LLP

(57) ABSTRACT

An audio codec (100) is provided with a control sequencer (110) interposed between control interface logic (120) and control registers (130) of the codec. A memory (114, 116) associated with the control sequencer (110) enables a burst of operations to be preloaded into the audio codec. In response to a single command from an external control processor (20), the sequencer (110) can then execute the burst with precise delays between each operation and without further direction from the processor. This frees the processor (20) to concentrate on other tasks within the system, and/or to enter a low-power mode to conserve energy. The system may be a personal media player.

32 Claims, 6 Drawing Sheets

CONTROL SEQUENCER

TECHNICAL FIELD

The present invention relates to a control sequencer (control port sequencer) for control of writes to registers in an electronic circuit, such as an audio codec.

BACKGROUND

Digital or mixed signal circuits often include registers for storing operating parameters, instructions and the like. An audio codec is an example of such a circuit. In this context, "audio codec" refers to a coder-decoder circuit for converting between digital audio and an analogue signal, involving at least some hardware functionality (principally, a DAC for D-to-A conversion and an ADC for A-to-D conversion) but possibly also partly implemented in software. Such an audio codec may be employed, for example, in a personal media player. The remainder of this specification will concentrate on the DAC part of an audio codec; however, the invention to be described later can also be applied to the ADC.

FIG. 1 shows where an audio codec 10 fits into a typical personal media player. For simplicity only the playback to headphone channel 146 is shown. More complex systems can also include microphone and speaker connections—the codec can be both a source and destination of digital audio data. Here, a single multimedia and control processor 20 is shown which supplies both digital audio data (via audio interface 142) and commands (via a control interface 124) to the audio codec 10; however, these two functions may be separated by providing a discrete control processor. Henceforth, the term "control processor" or simply "processor" is used to denote either a separate control processor or the combined media/control processor of FIGS. 1 and 2.

Most audio codecs can be configured in many different ways. Configuration is accomplished by sending commands to the codec via the control interface 124. These commands cause particular values to be entered into control registers of the audio codec (as described later), these control registers being referred to in operation of the codec. As an example, a volume level of the analogue signal may be defined by one of the values in the control registers.

As shown in FIG. 1, the audio codec 10 is only one functional block of the overall system making up the personal media player. Other blocks may include, for example, a screen 30, flash memory 32, a hard disk 34, a USB interface 36, SRAM 38 and so on, which as shown in the Figure, are all controlled by the multimedia and control processor 20.

During operation, some of the other blocks may require more urgent attention than the codec, making it difficult to guarantee precise delays between commands sent to the audio codec. Such delays make it difficult to ensure correct operation of the codec. The delays need to be precise because the analogue stages of the codec can contain large capacitors which can take hundreds of ms to reach a suitable voltage to allow the next stage to be powered up. On other occasions the delay between writes needs to be very short to avoid the voltage on a capacitor from decaying such as to cause a pop later when driven back to the correct value.

FIG. 2 shows an alternative system topology where control signals and data are combined onto a single serial interface 144. This is done to reduce the number of device pins required in a package housing the audio codec 10 (and likewise the processor 20). However, in this case there can be even more latency between commands, increasing the likelihood of problems in the codec.

Accordingly, it would be desirable to provide a codec with some means for allowing sequences of precisely timed register writes to be executed.

SUMMARY OF THE INVENTION

According to a first aspect of the present invention, there is provided a codec having one or more control registers, a control interface arranged to receive a command external to the codec, and a control sequencer responsive to said received command to execute a sequence of writes to the control registers at predetermined timings.

Preferably, control interface logic is connected to the control interface, the control sequencer being interposed between the control interface logic and the control registers.

Preferably also, a multiplexer is provided which is operable to couple the control registers selectively to either the control sequencer or to the control interface logic.

The control sequencer may comprise a memory provided for storing at least one said sequence, and a state machine for executing a said sequence stored in the memory. The memory can include a ROM and/or RAM Preferably, a status register is also provided for storing a completion status of the sequence executed by the sequencer. This can be part of the control interface logic and may be responsive to a signal sent from the control sequencer to the control interface logic.

According to a second aspect of the present invention, there is provided a system comprising the codec as defined above, together with at least one processor arranged to supply at least said command.

According to a third aspect of the present invention, there is provided a method of controlling a codec having one or more control registers and a control interface arranged to receive a command from the outside, the method comprising: receiving a command via said control interface; and triggering a control sequencer in response to said received command to execute a sequence of writes to the control registers at predetermined timings.

Embodiments of the invention can reduce the load on a control processor when executing register writes. Once a sequence has been initiated, the controlling processor is free to carry out other tasks within the system.

Embodiments of the invention add a new sequencer block to an audio codec which enables a burst of commands to be preloaded into the audio codec. The sequencer can then execute the burst with precise delays between each command without further direction from the processor. This frees the processor to concentrate on other tasks within the system.

A burst of commands and can be preloaded and then executed with defined delays between each command.

Other aspects of the invention provide a control sequencer for a codec, and software for providing the control sequencer when executed on a general-purpose processor.

According to further aspects of the invention, there are provided various systems employing the codec as defined in the appended claims. These include, but are not limited to, audio apparatus, portable media players (audio and/or video), headphone amplifiers, headphones, communications apparatus (e.g. mobile phones), video game consoles, and in-car entertainment systems having audio capability, including sat-nav and video systems.

BRIEF DESCRIPTION OF THE DRAWINGS

For a better understanding of the present invention, and to show more clearly how it may be carried into effect, reference will now be made, by way of example only, to the following drawings in which.

DETAILED DESCRIPTION

Figure 1:
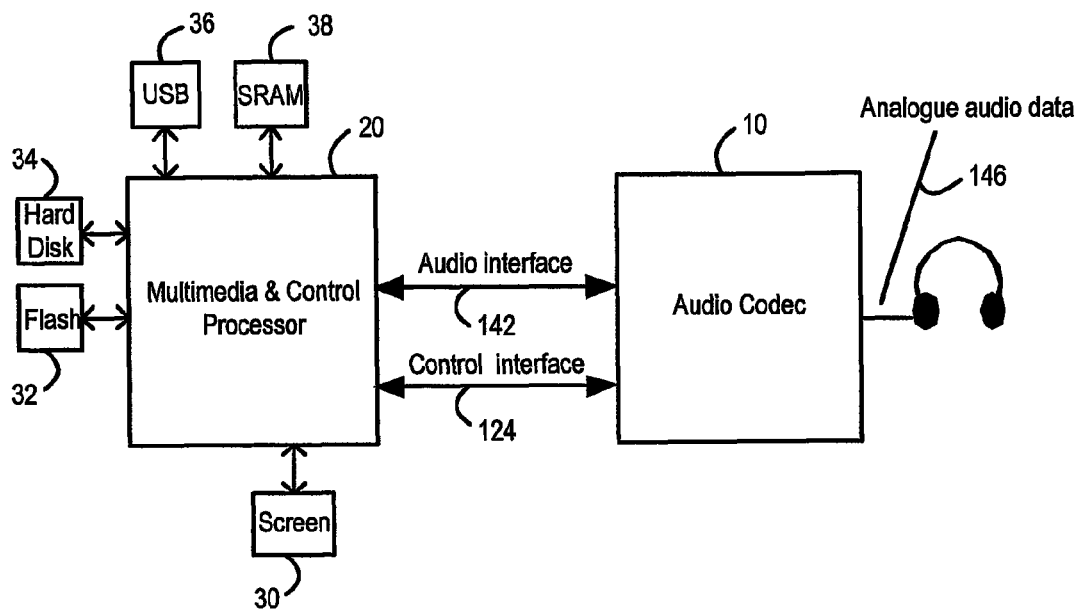
FIG. 1 is a system-level block diagram of a personal media player showing how the audio codec fits into the system.

Embodiments of the present invention will now be explained by referring to the drawings.

Figure 3:
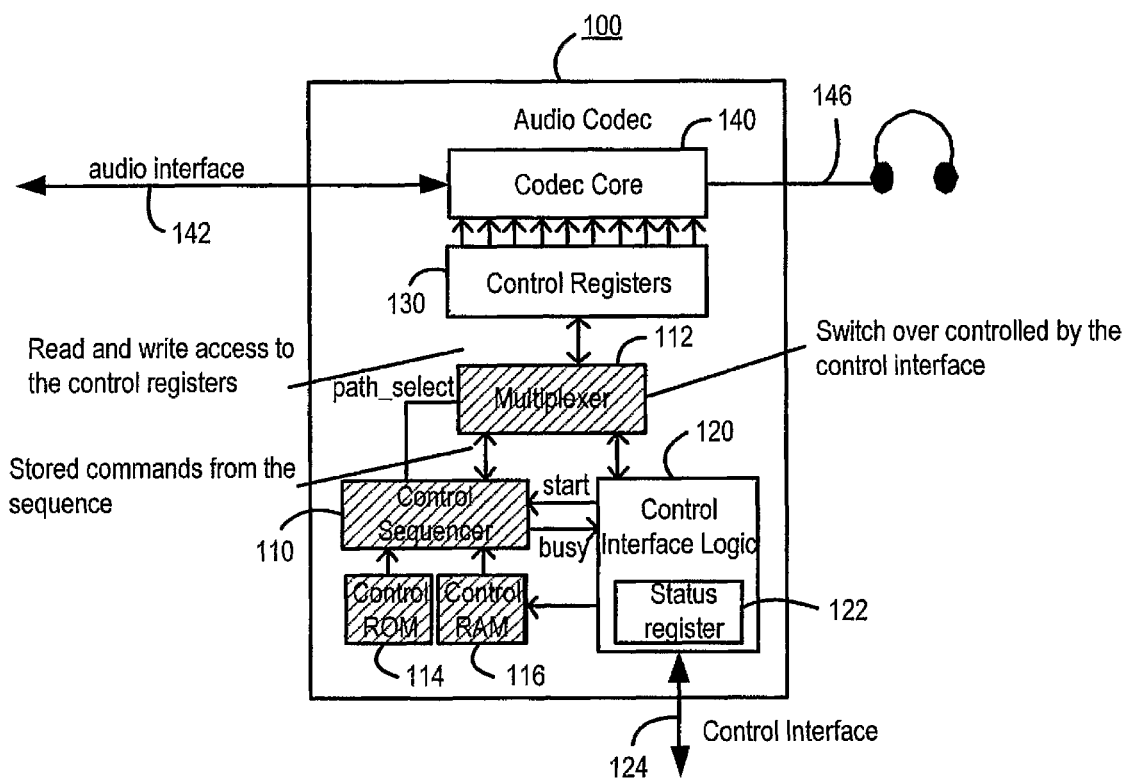
FIG. 3 shows an audio codec embodying the present invention.

FIG. 3 shows a codec embodying the present invention. Typically, the codec is provided in the form of a single package containing a chip and having pins for interfacing to the rest of the system of which it forms one functional block. As will be seen, the main elements of the codec are, as is known in the art, a codec core 140 for processing audio data, including processing digital audio received via the audio interface 142 to form analogue audio at the analogue output 146, control registers 130 for supplying values used in operation of the core 140, and control interface logic 120 for interfacing an internal bus of the codec to an external bus, denoted by control interface 124. The control interface logic 120 provides external access through the control interface 124 to the control registers 130. In a previously-proposed codec configuration, the control registers are connected directly to the control interface logic, so that individual writes to the control registers 130 are carried out by corresponding external commands.

The shaded portions of FIG. 3 show the elements newly added in this embodiment of the present invention. A control sequencer 110 allows a sequence of writes to be sent to the control registers 130 in a manner explained below. A multiplexer 112 allows switch over, such that the control sequencer 110 is connected to the registers 130 instead of the control interface logic 120. The control interface logic 120 includes a status register 122, the function of which is explained later. The control sequencer 110 has access to pre-programmed sequences for popular configurations from a control ROM 114. Optionally, new sequences can be loaded via the control interface logic 120 into a small RAM 116.

It is preferable to power up the audio codec without, or at least with minimal, audible pops and clicks at the analogue output 146. This can require a complex power up sequence with precise delays between each step. Unfortunately, precise delays are difficult to achieve in a real system and tend to be highly platform (e.g. player model) dependent. This can lead to much rework when proven sequences from one platform, produce unacceptable results on another. One advantage of the present invention is to make the timing of these operations independent of the software latency on a particular platform.

Figure 2:
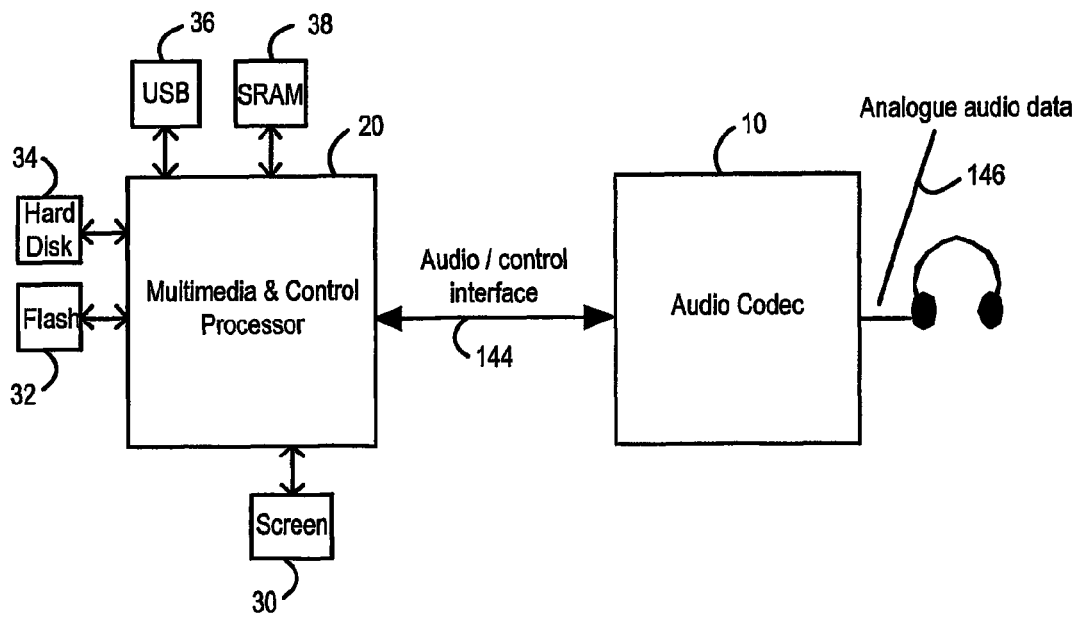
FIG. 2 is a modified version of FIG. 1 with a combined control/data interface.

In a previously-proposed system, the control processor 20 will have to send a number of individual commands to power up the codec 10. If the delays between these commands are not carefully controlled, fixed or intermittent pops and clicks can occur at the output 146. The processor 20 usually performs a number of tasks concurrently making precise delays difficult to achieve—the processor may have to ignore all other blocks in the system (such as the screen 30 in FIGS. 1 and 2, or a keypad, not shown) for a time to ensure that the delays remain fixed. Thus, avoiding pops and clicks at the analogue output of the codec may only be achievable at the cost of worsening operability elsewhere, for example by failing to respond promptly to a key press.

The present invention enables the control processor 20 to initiate a sequence of commands or operations with only a single start command. The delays between each step in the sequence are controlled on-chip (i.e. on the codec itself)—and are not affected by activities elsewhere in the system. Once a sequence is initiated, the processor 20 is then free to concentrate on other parts of the system. The status register 122 in FIG. 3 is provided to allow the processor to check that one sequence is complete before starting another.

Although pop and click suppression is an important application of the present invention, it also has other applications. Any sequence of control writes can be automated, allowing the processor 20 to initiate a thread of asynchronous control events, thereafter freeing the processor 20 to perform other tasks or go into a low power mode. By minimising the time that the control processor 20 is active, battery life of a portable system can be extended.

Other applications are also possible. For example, portable audio products are often required to make user interface noises in response to button presses or keystrokes. Often these require an event to start a note (beep) and then stop it a number of milliseconds later. The control sequencer 110 can be used to schedule the start and length, of one or more notes, in a single burst of commands. The processor 20 is then free to continue with other activities or enter a sleep state to save power.

A number of popular sequences can be predefined and stored in the on-chip read only memory (ROM) 114. This enables the most popular configurations to be selected via a single command.

A small on-chip RAM 116 is preferably also provided to enable user defined sequences to be added. This also allows the manufacturer to deploy factory proven 'patches' into the field, and also allows the customer to design and store their own sequences. In this context, the term "customer" refers to a system designer, mobile phone operator, and the like.

Figure 4:
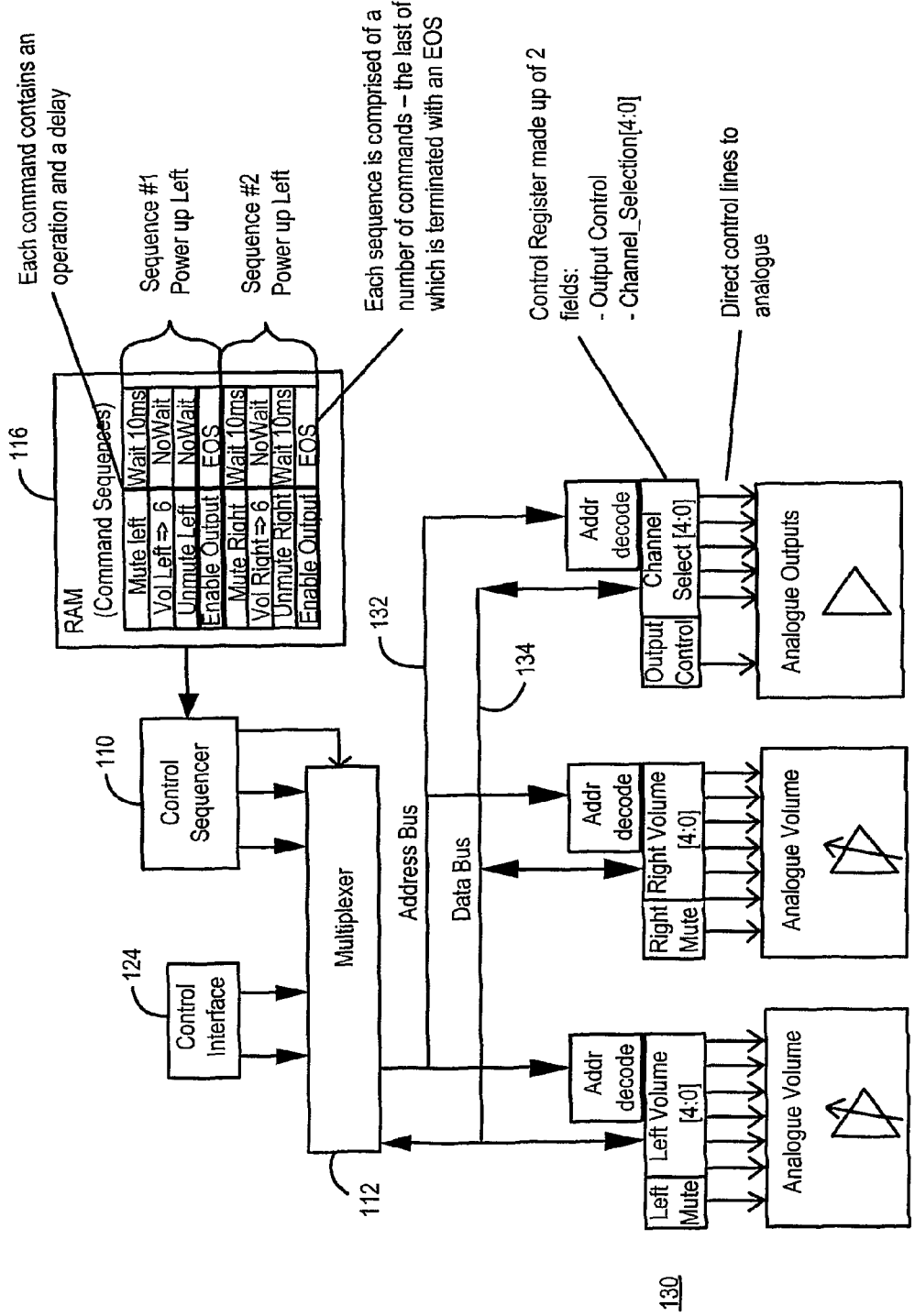
FIG. 4 shows the relationship between sequences, commands, control registers and fields in the audio codec of FIG. 3.

FIG. 4 illustrates some of the FIG. 3 elements in more detail to show how sequences of commands are stored and applied within the codec 100. A number of analogue functions requiring digital control are shown at the bottom of the diagram. Control information comes from a number of the control registers 130. The registers are connected to an address/data bus 132, 134 allowing either the control interface 124 (via the control interface logic 120), or the control sequencer 110 to read from or write to them, depending on the setting of the multiplexer 112. Individual analogue functions are controlled by fields within each register 130. For convenience, several fields can often be found in a single register. The RAM 116 (or ROM 114) can contain sequences of commands. Each command contains an operation and a delay value. The operation (e.g. a Mute Left operation to silence the left channel of a stereo audio signal) contains data and address information to write a new value into a field within one of the control registers 130. Each sequence is terminated with an EOS (end-of-sequence) flag allowing several sequences at a time to be stored in the RAM or ROM.

With appropriate setting of the multiplexer 112, direct writes are still possible; that is, commands can be sent to the codec 100 by writing to one or more control registers 130 from the control interface 124, as in the previously-proposed codec. However, the memory map of a mixed signal device is such that several fields sometimes share the same word. This creates a problem for the sequencer 110: a predefined write to the entire word may disturb previous writes made by the user. For this reason, the sequencer 110 preferably has the ability to write to only part of a control register word. This allows individual fields in the word to be written while leaving others untouched. This capability also simplifies software access for direct writes because the processor 20 no longer needs to perform a read-modify-write operation to ensure that only the field of interest is changed.

The data format for the sequencer 110 is arranged to give maximum flexibility for minimum memory overhead. Essentially the memory 114 or 116 can be configured to contain multiple short sequences or a single long sequence. Each sequence can contain many short operations or one or more long operations.

As examples of the control interface 124, an I2C based 2 wire interface or an SPI based 3-wire interface are currently popular. The present invention applies equally to either format, because the control interface logic translates the signals on the control interface into a suitable format for an internal bus of the codec. It can also be applied to the AC97 interface and to upcoming interfaces like HDA and Slimbus. These interfaces time-multiplex data and control onto a single interface, thus providing the combined audio/control interface 144 shown in FIG. 2. (Henceforth, 124 is used to denote either a dedicated control interface or this combined audio/control interface). The use of a combined interface actually increases software latency because there is additional uncertainty about when the write can take place, due to the need to synchronise with the data path. This phenomenon further underscores the benefit of the control sequencer of the present invention, since it is internal to the device and is not constrained by the time multiplexing, allowing a sequence of writes to occur in rapid succession or with defined gaps in between.

To reduce pin count of the codec package, control interfaces like SPI and I2C shift data to and from the device in a serial format. Generally the control data is converted back to parallel for on-chip use. The sequencer 110 is placed across this internal parallel bus. This makes it independent of the external control bus being used, and allows continued support for the basic protocol whilst sequences are in progress. In other words, the control sequencer 110 is arranged to communicate with the status register 122 of the control interface logic to set a complete or non-complete status of the current sequence of writes. This feature allows the control processor 20 to check that one sequence is complete before starting another, or abort a sequence which is no longer required.

The sequencer contains, or is associated with, the ROM 114 and RAM 116 mentioned above, and further contains a state machine which is described in more detail below. The ROM 114 contains predefined sequences for the device allowing the most popular configurations to be selected from a single write. For example an audio codec may include a predefined sequence to power up the headphone output in a pop free manner and prepare the device to playback digital data. The ROM 114 would be preloaded during the design or manufacture of the device and would not change during its lifetime.

As shown in FIG. 3, the RAM 116 can be accessed directly from the control interface 124 via a bank of reserved addresses (not illustrated). RAM data is stored in the same format as the ROM data and they form a contiguous address space.

The state machine can execute sequences from the RAM or ROM. Sequences executed by the sequencer 110 are initiated from the control interface 124 by writing to a reserved address to execute a sequence starting from a particular RAM or ROM address. The sequencer 110 will then execute commands from successive addresses until an end of sequence EOS marker is reached. At a given time, the RAM/ROM 114,116 can contain several sequences.

As mentioned, each command in the sequence can include a delay value which sets the time that execution will pause before executing the next command. To reduce memory overhead, in a preferred embodiment, the delay is stored as a 4-bit number delay coefficient $\tau$. The delay time is given by $k2^\tau$ where k is a constant.

Figure 5:
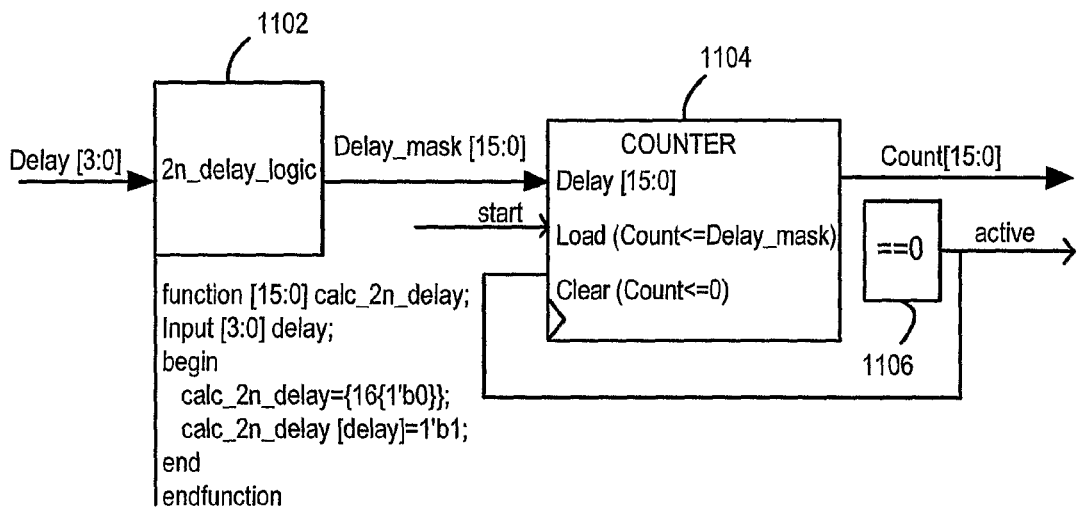
FIG. 5 shows one possible implementation of a delay counter employed in an embodiment of the present invention.

Thus, the sequencer 110 includes a delay counter which is counted down for example, starting with the delay value of the present command, before executing the next command in the sequence. FIG. 5 shows one way of implementing the delay counter, including the relevant Verilog™ code. A wide range of delays can be supported using a decoder 1102 and counter 1104. A single bit in the counter 1104 is selected by the 4-bit delay value. Setting start high for 1 cycle causes the counter 1104 to load the selected delay from decoder 1102. The counter will then decrement until zero is reached. This allows support for a 1 in 32,767 (32K) range of delays from a simple counter with a 4-bit delay select, thereby minimising the memory overhead of storing the commands.

Figure 8:
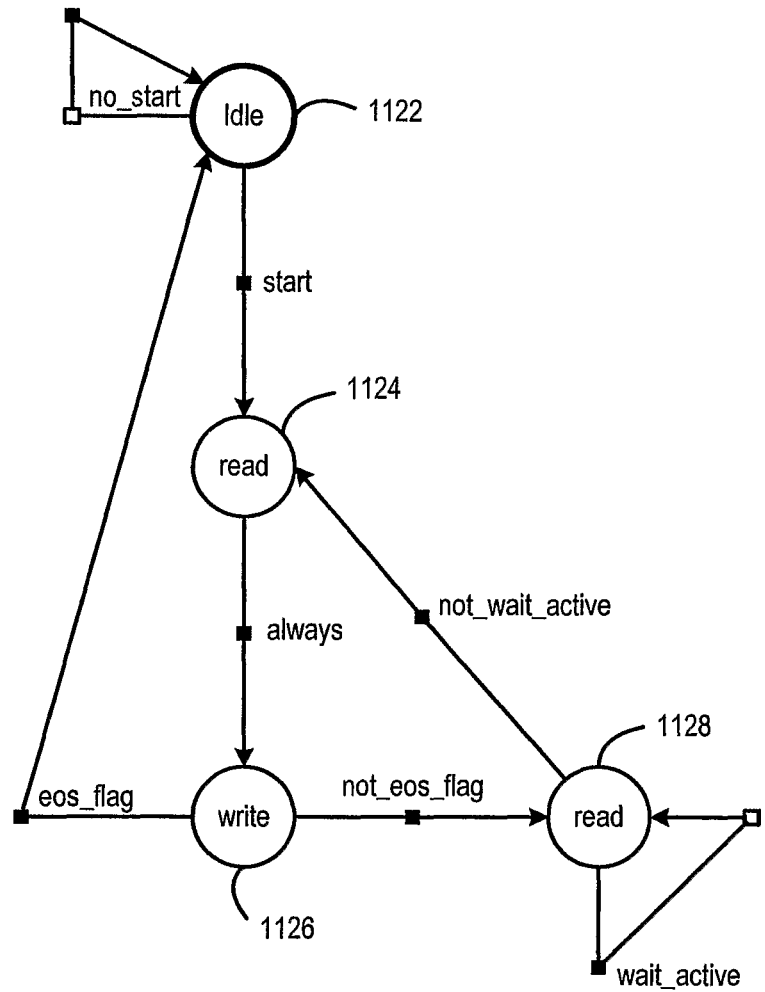
FIG. 8 illustrates a state machine employed in an embodiment of the present invention.

The main state machine (which is schematically shown in FIG. 8 as described below) always waits for the delay counter to reach zero before executing the next command. If the current command has the EOS flag set, no delay is required and the state machine will return control to the control interface 124.

A value for k of 35 µs offers 16 delay settings from tens of µs to around a second. In practice k, is set using a dividing counter from a high speed clock (not shown). If required, a wider range of delay settings can be supported by making the division programmable.

Figure 6:
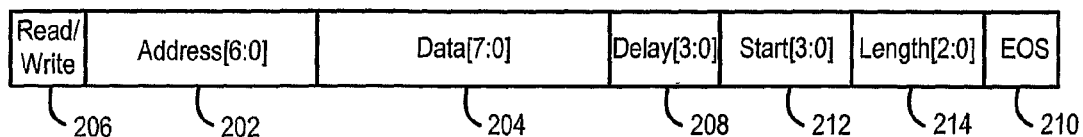
FIG. 6 shows an example of the format of a control word in an embodiment of the present invention.

FIG. 6 shows an example of how the control words can be arranged. Each word contains the details of the write: Address 202, Data 204 and write enable 206. A delay value 208 is included to control the time between writes as just described. The EOS flag 210 is used to indicate that the current write is the last in the sequence and that control should be returned to the control interface 124 once the write is complete.

The start and length fields 212, 214 form a mask which allows the write to be restricted to an individual field within the write. The mask byte comprises: Start 212, a pointer to the LSB of the field within the word; and a field Length 214, indicating the number of bits in the field. For example, if the word format is 16-bits wide, an 8-bit mask can be used with a 4-bit bit pointer and a 3-bit length field. This would allow any 1 to 8-bit contiguous field within the word to be accessed.

A global mask word is also included in the main register map. This allows masked accesses to be performed direct from the control interface 124. This addresses the more generic problem of having to maintain shadow registers within the application software to ensure that writes to a field within a word don't disturb other fields within the same word.

To support the masking feature, each write triggers a 3 stage internal process:
- Read: as soon as the address is known, the word is read into a temporary register
- Modify: the mask is used to update only the bits of interest in the temporary register
- Write: the temporary register is written back to the address of interest The above process ensures that only the bits selected by the mask are changed by the access, all other bits being left in their previous state. In this way random access to every field within the register map is provided. This feature is highly desirable for a write sequencer with predefined sequences—since the predefined sequences cannot anticipate what state the user has set other bits within the word to.

Figure 7:
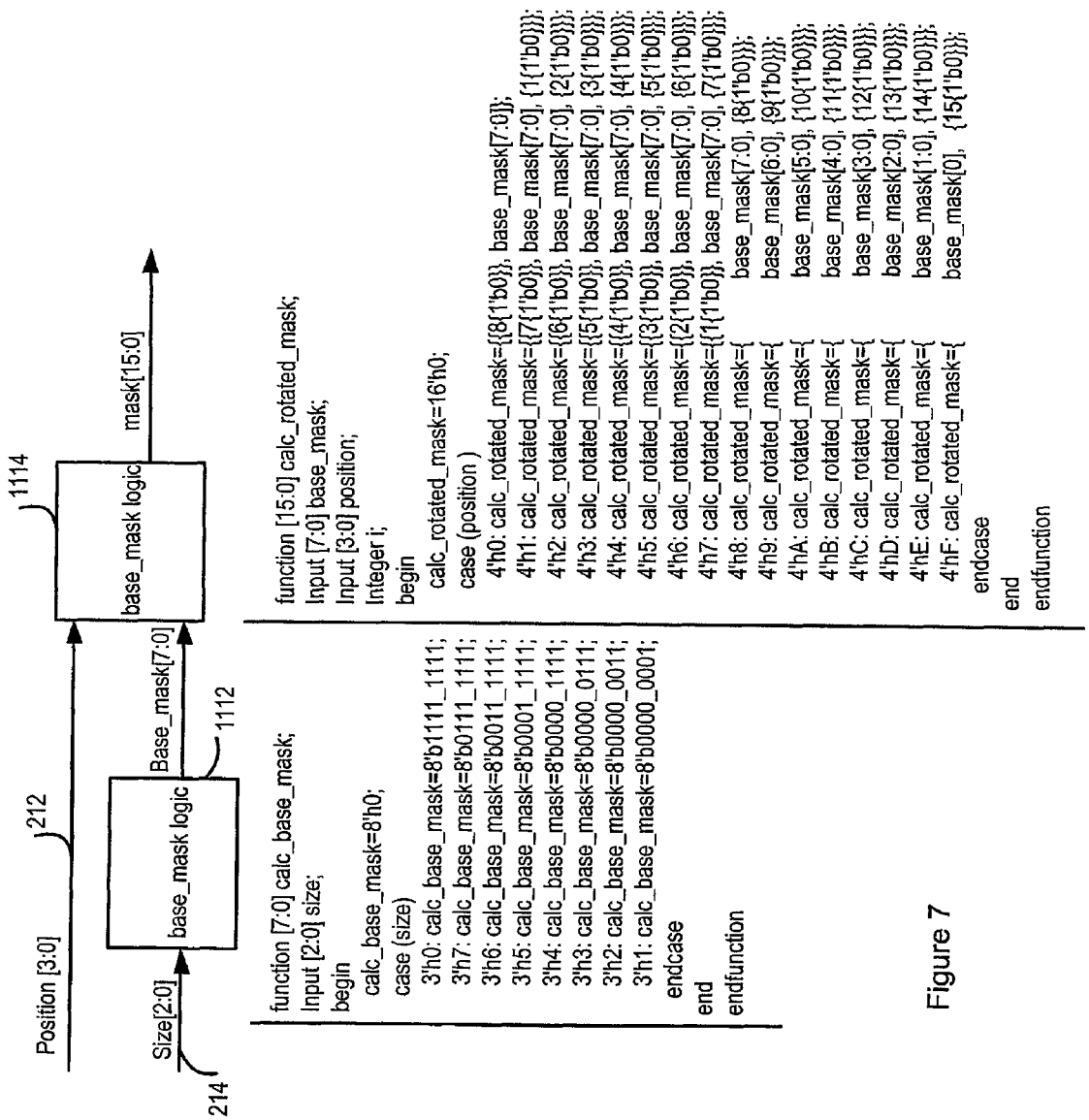
FIG. 7 is for explaining a possible implementation of a mask function used in an embodiment of the present invention.

The mask itself is implemented as a 2 stage combinatorial logic block 1112, 1114 shown in FIG. 7. The first stage 1112 decodes the start and width fields into a 16-bit mask with a one on each bit which is to be changed and a 0 at every other bit. The second stage 1114 comprises of a 2 to 1 multiplexer for each bit using the mask as a select, and selecting the new data if the mask is 1 and the old data if the mask is 0. An implementation of the mask function in Verilog™ HDL is also shown in FIG. 7.

In the completed circuit, the incoming data must be rotated in a similar way to the mask to ensure that the correct bits appear in the correct place.

FIG. 8 is a control diagram for the main state machine. There are 3 inputs which cause the state machine to move between states:

Start: Pulses when a start sequence command is issued by the control interface logic 120 in response to a start command being sent across the control interface 124

EOS: Goes high when the last command read contained an EOS flag.

Wait Active: From the delay counter to indicate that a delay is still in progress.

The transitions in the diagram are labelled in relation to events on these input signals. The state machine has 4 states:

Idle 1122: This is the default and the reset state. When in this state the control interface has control of the internal control bus. Outside the idle state the multiplexer 112 shown in FIGS. 3 and 4 is switched over to give control to the control sequencer 110. Exit from the Idle state occurs when a start command is received. Exiting the idle state will cause the first word to be retrieved from the ROM/RAM 114,116.

Read 1124: In this state the contents of the address of interest are read back, merged with the new data (rotated and masked) and stored in a temporary register within the control sequencer 110. The state machine cannot loop in the read state and will always proceed immediately to the write state.

Write 1126: In this state, the modified data is written back to the control register 130 completing the access. If this was the last command in the sequence, the state machine returns to the idle state which allows the control port 124 to take control of the internal bus again. If there is no EOS, the state machine moves into the wait state, at the same time the delay counter 1104 is loaded with the required delay count.

Read 1128: In this state, the state machine starts waiting for the counter 1104 to decrement to zero indicating that the delay is complete. When the delay counter reaches zero the next command is read and control returns to the read state.

Thus, in an embodiment of the present invention, an audio codec (100) is provided with a control sequencer (110) interposed between control interface logic (120) and control registers (130) of the codec. A memory (114, 116) associated with the control sequencer (110) enables a burst of operations to be preloaded into the audio codec. In response to a single command from an external control processor (20), the sequencer (110) can then execute the burst with precise delays between each operation and without further direction from the processor. This frees the processor (20) to concentrate on other tasks within the system, and/or to enter a low-power mode to conserve energy.

The control sequencer according to the invention can be used in integrated circuits such as audio codecs that are used in audio apparatus including, for example, portable media players, headphone amplifiers, headphones, communications apparatus (e.g. mobile phones), and in-car entertainment systems having audio capability including sat-nav and video systems. More generally, the invention may be applied to reproducing and/or recording any media involving audio data such as video files, DVDs etc., and in numerous other applications.

The skilled person will recognise that the above-described apparatus and methods may be embodied as processor control code, for example on a carrier medium such as a disk, CD- or DVD-ROM, programmed memory such as read only memory (Firmware), or on a data carrier such as an optical or electrical signal carrier. For many applications, embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re-)programmable analogue array or similar device in order to configure analogue hardware.

It should be noted that the above-mentioned embodiments illustrate rather than limit the invention, and that those skilled in the art will be able to design many alternative embodiments without departing from the scope of the appended claims or drawings. The word "comprising" does not exclude the presence of elements or steps other than those listed in a claim, "a" or "an" does not exclude a plurality, and a single element or other unit may fulfil the functions of several units recited in the claims. Any reference signs in the claims shall not be construed so as to limit their scope.

The invention claimed is:

1. A codec comprising:
   a control interface for receiving a control command from external to the codec,
   memory for storing at least one sequence of stored commands, wherein each stored command comprises an operation and a delay time;
   a plurality of control registers for controlling operation of the codec; and
   a control sequencer responsive to said received control command to execute a specified said sequence of stored commands,
   wherein said control sequencer is configured to perform the operation specified in a stored command to write control data to the control registers to control operation of the codec, and delay for a period of time based on said delay time of the stored command before performing the operation of the next stored command of the sequence.

2. The codec according to claim 1 further comprising control interface logic connected to the control interface, the control sequencer being interposed between the control interface logic and with the control registers.

3. The codec according to claim 2 further comprising a multiplexer operable to couple the control registers selectively to either the control sequencer or to the control interface logic.

4. The codec according to claim 2 wherein the control sequencer comprises a state machine for executing said at least one sequence of stored commands.

5. The codec according to claim 4 wherein said memory comprises a ROM for at least one predefined sequence of stored commands.

6. The codec according to claim 4 wherein the memory comprises a RAM for storing at least one sequence of stored commands input to the codec via the control interface logic.

7. The codec according to claim 2 further comprising a status register for storing a completion status of the sequence of stored commands executed by the sequencer.

8. The codec according to claim 7 wherein the status register is part of the control interface logic and is responsive to a signal sent from the control sequencer to the control interface logic.

9. The codec according to claim 1 further comprising a codec core arranged to receive one or more values stored in the control registers.

10. The codec according to claim 9 further comprising a data interface separate from said control interface, the data interface arranged to receive data and coupled to the codec core.

11. The codec according to claim 9 wherein the control interface is a combined control and data interface.

12. The codec according to claim 10 wherein the data is digital audio data, and further comprising an analogue audio interface for at least outputting an analogue audio signal.

13. The codec according to claim 1 wherein the sequence of stored commands is a power-up or power-down sequence for the codec.

14. The codec according to claim 12 wherein the sequence of stored commands is for producing a user interface sound via the analogue audio interface.

15. The codec according to claim 1 wherein the or each sequence of stored commands is variable in length so as to include differing numbers of operations.

16. The codec according to claim 1 wherein the delay time is defined by k2r where k is a constant and T is a delay coefficient.

17. The codec according to claim 1 wherein each of the control registers is arranged to store a word comprising a plurality of fields, and the control sequencer is arranged to carry out writes to individual said fields.

18. The codec according to claim 17 wherein each stored command includes fields for address, data, write enable and a mask which allows the write to be restricted to an individual field in the control registers.

19. A system comprising the codec according to claim 1 together with at least one processor arranged to supply at least said control command.

20. A system comprising the codec according to claim 10 together with a media and control processor arranged to supply said control command and said data.

21. The system according to claim 19 further comprising a plurality of functional blocks connected to said processor, said processor being arranged, following supply of said control command to the control sequencer, to supply a further command to a said functional block without waiting for execution of said sequence.

22. The system according to claim 21, wherein the system is powered by a battery and the processor is arranged to enter a low-power or power-down state following supply of said control command, without waiting for execution of said sequence.

23. The system according to claim 21, wherein the system is an audio apparatus.

24. The system according to claim 21, wherein the system is a personal media player and the functional blocks include a display and a memory for storing media data.

25. The system according to claim 24 wherein the media player is for at least reproducing audio data among said media data.

26. A control sequencer for the codec of claim 1.

27. A non-transitory storage medium including computer program code which, when implemented by a general-purpose logic circuit, provides the control sequencer of claim 26.

28. A method of controlling a codec having one or more control registers and a control interface arranged to receive a control command from the outside, the method comprising:
receiving a control command via said control interface; and
triggering a control sequencer in response to said received command to execute a sequence of stored commands, said sequence being stored in a memory of the codec;
wherein each stored command comprises an operation and a delay time; and
wherein executing said sequence of stored commands comprises performing the operation specified in a stored command to write control data to the control registers to control operation of the codec, and delaying for a period of time based on said delay time of the stored command before performing the operation of the next stored command of the sequence.

29. The method according to claim 28, further comprising multiplexing the control sequencer and the control interface logic to the control registers so as to couple the control registers selectively to either the control sequencer or to the control interface logic.

30. The method according to claim 28, further comprising executing said sequence of stored commands using a state machine.

31. The method according to claim 30, further comprising storing in a status register a completion status of the sequence of stored commands executed by the sequencer.

32. The method according to claim 28, applied to a power-up or power-down sequence for the codec.

* * * * *